US010401922B2

(12) United States Patent
Ehlen

(10) Patent No.: US 10,401,922 B2
(45) Date of Patent: Sep. 3, 2019

(54) MEMORY DRIVE STORAGE TRAY AND MEMORY DRIVE CARRIER FOR USE THEREWITH

(71) Applicant: Facebook, Inc., Menlo Park, CA (US)

(72) Inventor: Jon Brian Ehlen, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 110 days.

(21) Appl. No.: 14/679,761

(22) Filed: Apr. 6, 2015

(65) Prior Publication Data

US 2016/0293223 A1   Oct. 6, 2016

(51) Int. Cl.
G11B 33/02 (2006.01)
G06F 1/18 (2006.01)
G11B 33/12 (2006.01)
G11B 33/00 (2006.01)

(52) U.S. Cl.
CPC ............ G06F 1/187 (2013.01); G11B 33/124 (2013.01); G11B 33/128 (2013.01); G11B 33/005 (2013.01); G11B 33/123 (2013.01); G11B 33/127 (2013.01)

(58) Field of Classification Search
CPC ... G11B 33/005; G11B 33/123; G11B 33/124; G11B 33/127; G11B 33/128; G06F 1/187
See application file for complete search history.

(56) References Cited

U.S. PATENT DOCUMENTS

| 5,553,412 | A | * | 9/1996 | Briechle | G09F 3/204 40/124.01 |
|---|---|---|---|---|---|
| 5,886,869 | A | | 3/1999 | Fussell et al. | |
| 6,040,980 | A | * | 3/2000 | Johnson | G11B 33/124 312/333 |
| 6,236,563 | B1 | * | 5/2001 | Buican | G06F 1/184 312/333 |
| 6,317,334 | B1 | | 11/2001 | Abruzzini et al. | |
| 7,009,838 | B2 | * | 3/2006 | Roh | G06F 1/184 312/223.1 |
| 8,462,495 | B1 | | 6/2013 | Keefe et al. | |
| 8,743,536 | B2 | | 6/2014 | Alo et al. | |

(Continued)

OTHER PUBLICATIONS

Restriction Requirement dated Jul. 6, 2016, for U.S. Appl. No. 14/679,789 by Ehlen, J., et al., filed Apr. 6, 2015.

(Continued)

*Primary Examiner* — Steven T Sawyer
*Assistant Examiner* — Paresh H Paghadal
(74) *Attorney, Agent, or Firm* — FisherBroyles, LLP

(57) ABSTRACT

Technology is provided for a memory drive storage tray. The memory drive storage tray includes a frame that defines one or more drive bays, each configured to contain a memory drive. Each drive bay includes an associated drive connector for interfacing the memory drive with the memory drive storage tray. Each drive bay also includes a first retainer tab positioned on the frame adjacent the drive connector and a second retainer tab, longer than the first retainer tab, positioned on the frame opposite the first retainer tab. A resilient member, such as a leaf spring, is centrally positioned in the drive bay opposite the drive connector to urge the memory drive toward the drive connector. The resilient member holds the memory drive in place against the drive connector and under the first and second retainer tabs.

17 Claims, 10 Drawing Sheets

(56) References Cited

U.S. PATENT DOCUMENTS

| | | | |
|---|---|---|---|
| 9,552,024 B2* | 1/2017 | Lin | G06F 1/187 |
| 9,691,435 B2 | 6/2017 | Ehlen | |
| 9,763,353 B1* | 9/2017 | Beall | H05K 7/1488 |
| 2002/0050552 A1* | 5/2002 | Reznikov | G11B 33/122 |
| | | | 248/682 |
| 2005/0030721 A1 | 2/2005 | Shimada et al. | |
| 2005/0257232 A1 | 11/2005 | Hidaka | |
| 2006/0061954 A1* | 3/2006 | Lam | G06F 1/184 |
| | | | 361/679.35 |
| 2006/0292918 A1 | 12/2006 | Behl et al. | |
| 2007/0105419 A1* | 5/2007 | Chen | G11B 33/12 |
| | | | 439/138 |
| 2013/0127310 A1 | 5/2013 | Yu et al. | |
| 2013/0201626 A1* | 8/2013 | Bondurant | G06F 1/1658 |
| | | | 361/679.58 |
| 2014/0205394 A1* | 7/2014 | Chao | G11B 33/128 |
| | | | 411/132 |
| 2015/0382499 A1 | 12/2015 | Chiasson et al. | |
| 2016/0293224 A1 | 10/2016 | Ehlen et al. | |
| 2017/0329373 A1 | 11/2017 | Ehlen | |

OTHER PUBLICATIONS

U.S. Appl. No. 14/679,789 by Ehlen, J., et al., filed Apr. 6, 2015.
U.S. Appl. No. 15/154,388 by Ehlen, J., et al., filed May 13, 2016.
U.S. Appl. No. 14/679,761 of Ehlen, Jon Brian filed Apr. 6, 2015.
Non-Final Office Action dated Nov. 25, 2016, for U.S. Appl. No. 14/679,789 by Ehlen, J., et al., filed Apr. 6, 2015.
Non-Final Office Action dated Oct. 6, 2017 for U.S. Appl. 15/154,388 by Ehlen, J. et al., filed May 13, 2016.
Notice of Allowance dated Apr. 10, 2017, for U.S. Appl. 14/679,789 by Ehlen, J., et al., filed Apr. 6, 2015.

* cited by examiner

MEMORY DRIVE STORAGE TRAY AND MEMORY DRIVE CARRIER FOR USE THEREWITH

TECHNICAL FIELD

This patent application is directed to data storage server configurations and, more specifically, to a memory drive storage tray and a memory drive carrier.

BACKGROUND

Traditional memory drive storage trays include individual covers to retain the memory drives in their corresponding drive bays. However, these covers can make servicing the memory drives more difficult and can also interfere with cooling the memory drives. The drive bays of memory drive storage trays are usually configured to accept one type and size of memory drive, such as a 3.5 inch hard disc drive (HDD). However, in the course of maintaining and upgrading data storage servers, it may be desirable to change the memory drive type and/or size. For example, in some cases, it may be desirable to replace a 3.5 inch HDD with a 2.5 inch solid state drive (SSD). Accordingly, there is a need for memory drive storage trays that are convenient to service and allow improved cooling of memory drives. There is also a need to adapt memory drives for insertion into a drive bay that is configured for a different size and/or type of memory drive.

BRIEF DESCRIPTION OF THE DRAWINGS

Embodiments of the memory drive storage tray and memory drive carrier introduced herein may be better understood by referring to the following Detailed Description in conjunction with the accompanying drawings, in which like reference numerals indicate identical or functionally similar elements.

Figure 1:
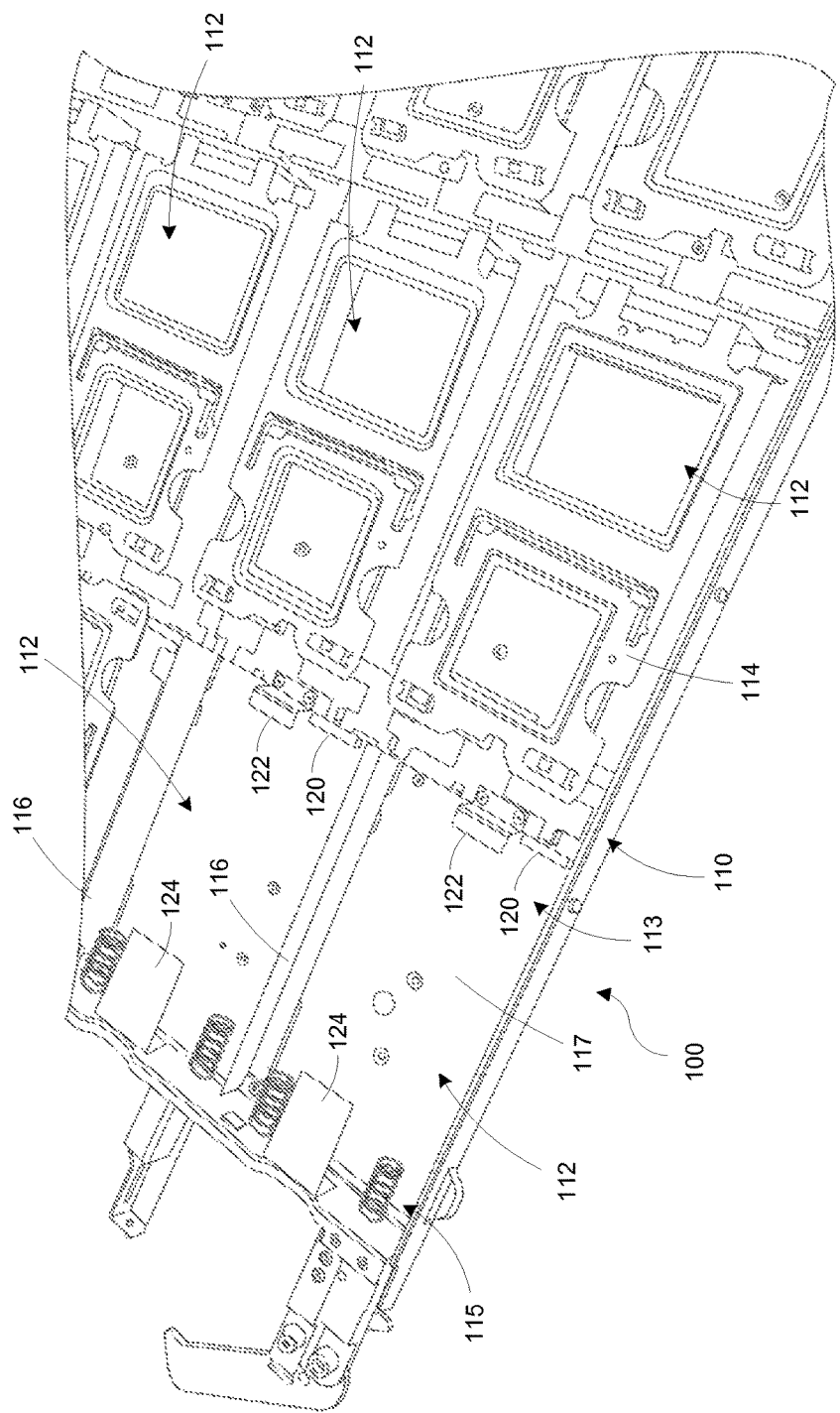
FIG. 1 is a partial perspective view of a memory drive storage tray according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

Memory drive storage trays and a memory drive carriers are disclosed. In an embodiment, the memory drive storage tray includes a frame that defines one or more drive bays, each configured to contain a memory drive, such as a 3.5 inch HDD. Each drive bay includes an associated drive connector for interfacing the memory drive with the memory drive storage tray. Each drive bay also includes a first retainer tab coupled to the frame adjacent the drive connector and a second retainer tab, longer than the first retainer tab, coupled to the frame generally opposite the first retainer tab. A resilient member, such as a leaf spring, is coupled to the frame in the drive bay generally opposite the drive connector to urge the memory drive toward the drive connector. A memory drive is installed in one of the drive bays by sliding one end of the memory drive under the second retainer tab and against the resilient member until the other end of the memory drive clears the first retainer tab. Next, the memory drive is pivoted or rotated so it can slide under the first retainer tab, and the memory drive slides toward the drive connector via the resilient member under the first retainer until it operatively engages the drive connector. The resilient member holds the memory drive in place against the drive connector and under the first and second retainer tabs.

The memory drive carrier adapts a memory drive for insertion into a drive bay that is larger than the memory drive. For example, in some embodiments, the memory drive carrier adapts a 2.5 inch SSD for insertion into a 3.5 inch HDD drive bay. The memory drive carrier includes an adapter body having a frame that defines an envelope compatible with the drive bay. The adapter body also includes a plurality of spaced apart walls defining a slot sized to receive the memory drive and position the memory drive's connector within the envelope adjacent an associated drive connector of the drive bay.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a memory drive storage tray 100 according to a representative embodiment. The memory drive storage tray 100 includes a frame 110 and a plurality of partitions 116 defining a plurality of drive bays 112. Each drive bay has a front end portion 113, a rear end portion 115, a bottom wall 117, and an open top. Each drive bay 112 also includes an associated drive connector 120 at the front end portion 113 that connects to a memory drive, such as a 3.5 inch HDD. In some embodiments, selected ones of the drive bays 112 include retainer tabs 122 and 124 to hold the memory drive in position within the drive bays 112 while the remaining drive bays employ traditional drive bay covers 114. In at least one embodiment, all of the memory drive storage tray drive bays include the retainer tabs 122 and 124 rather than the covers 114. The retainer tabs 122 and 124 provide for easier access to install and remove the memory drives and also allow improved cooling of the memory drives. It has been found in some applications that using the retainer tabs 122 and 124, rather than the covers 114, allows the memory drives to run approximately three degrees cooler.

Figure 2:
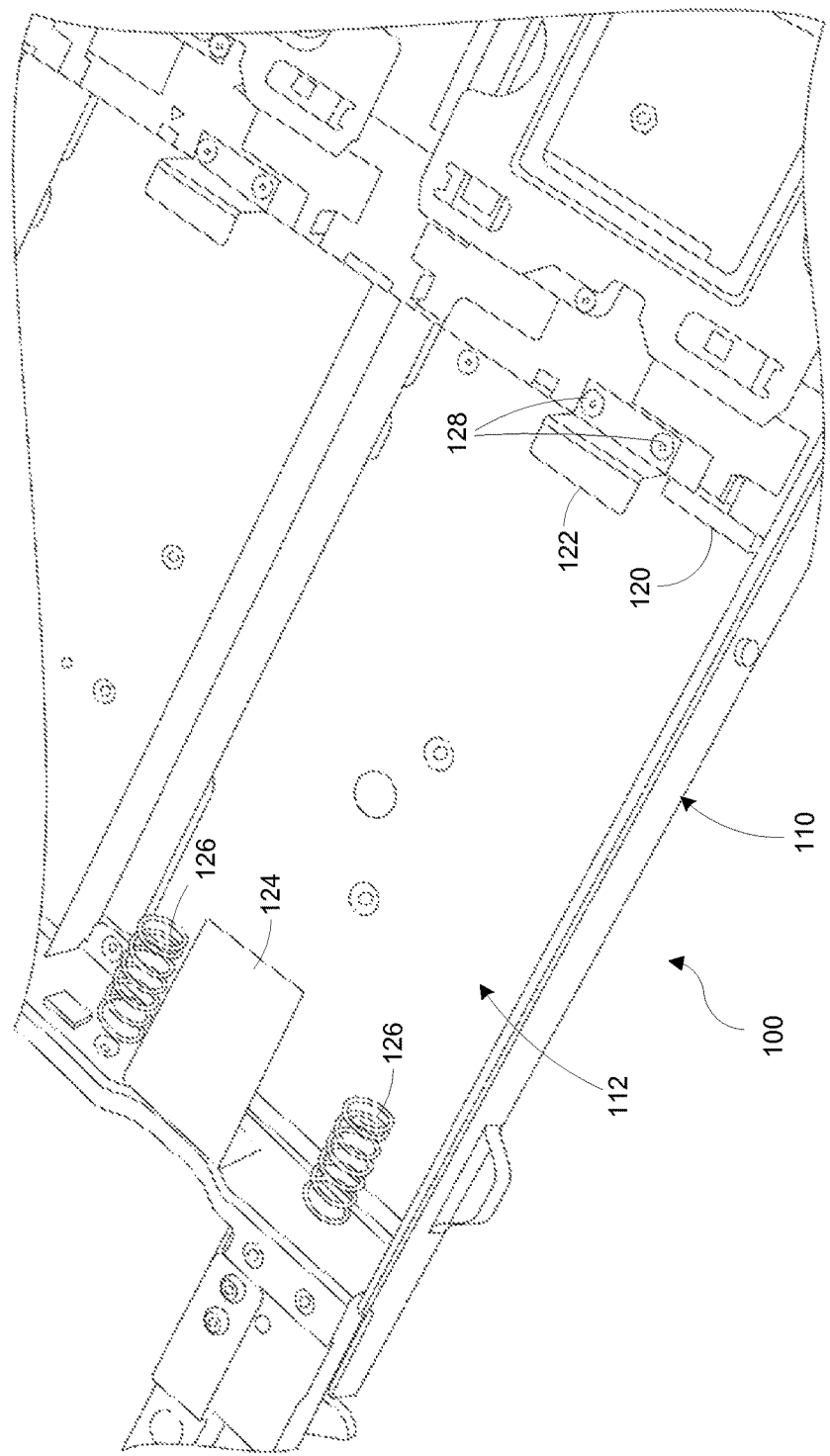
FIG. 2 is an enlarged partial perspective view of a drive bay in the memory drive storage tray.

As shown in FIG. 2, the drive bay 112 includes a first retainer tab 122 positioned on the frame 110 at the front end portion 113 of the drive bay and adjacent the drive connector 120. A second retainer tab 124 is positioned on the frame 110 at the rear end portion 115 of the drive bay generally opposite the first retainer tab 122. At least one resilient member 126 is positioned in the drive bay 112 opposite the drive connector 120. In this embodiment, there are two resilient members 126 in the form of compression springs that are operative to urge a memory drive toward the drive connector 120 as explained more fully below. In some embodiments, the retainer tabs 122 and 124 are attached to the frame 110 by suitable fasteners 128, such as rivets, welds, screws, adhesive, or other fasteners. In still other embodiments, the retainer tabs 122 and 124 are integrally formed with the frame 110. Accordingly, the frame 110 and the retainer tabs 122 and 124 may be comprised of sheet metal. In some embodiments, the resilient members 126 can be adhered or welded to the frame 110. In other embodiments, the resilient members 126 can be attached to the frame 110 with suitable fasteners.

Figure 3:
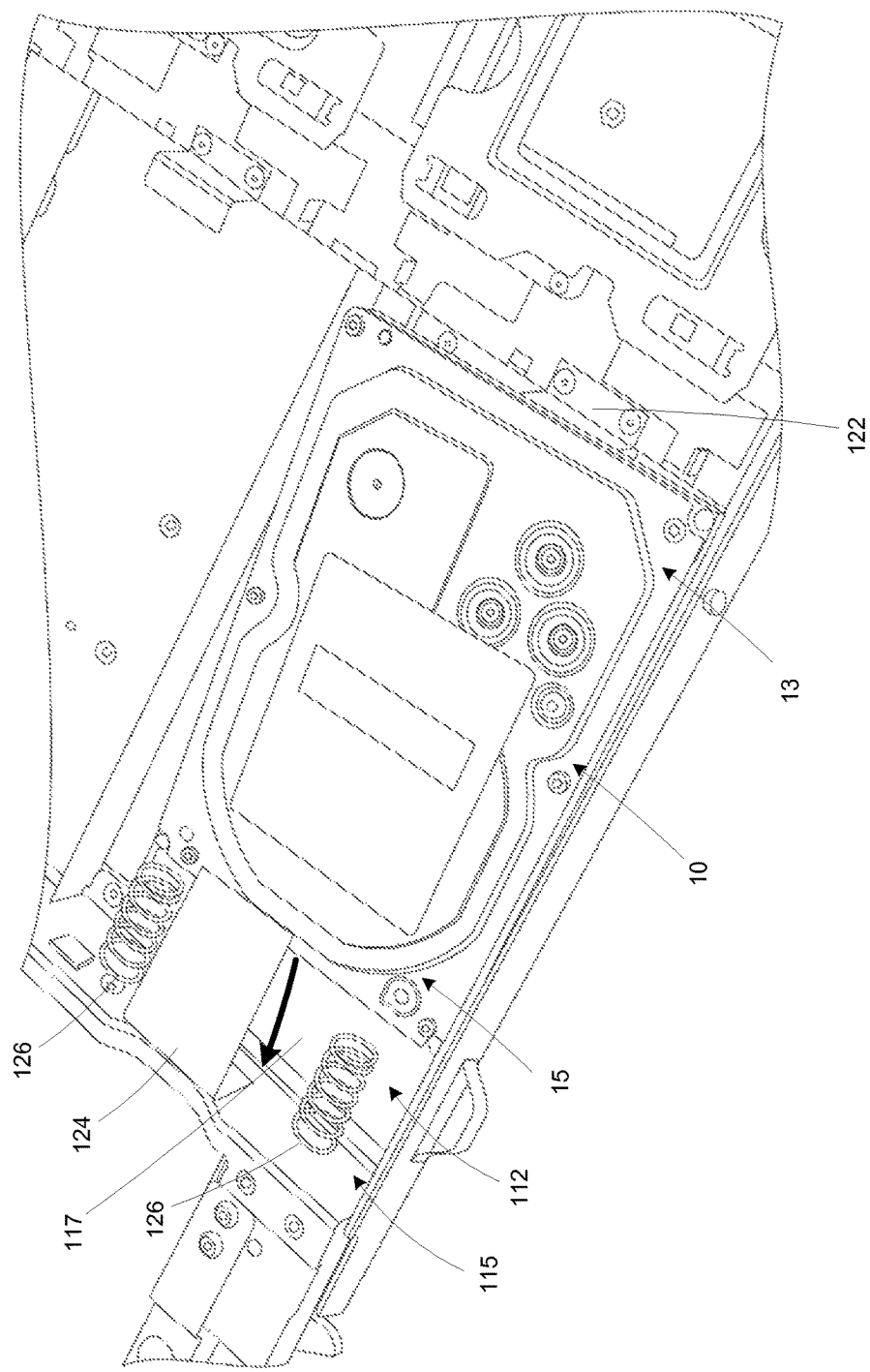
FIG. 3 is an enlarged partial perspective view illustrating a hard disc drive shown in an intermediate position during insertion into the drive bay of FIG. 2.
Figure 4:
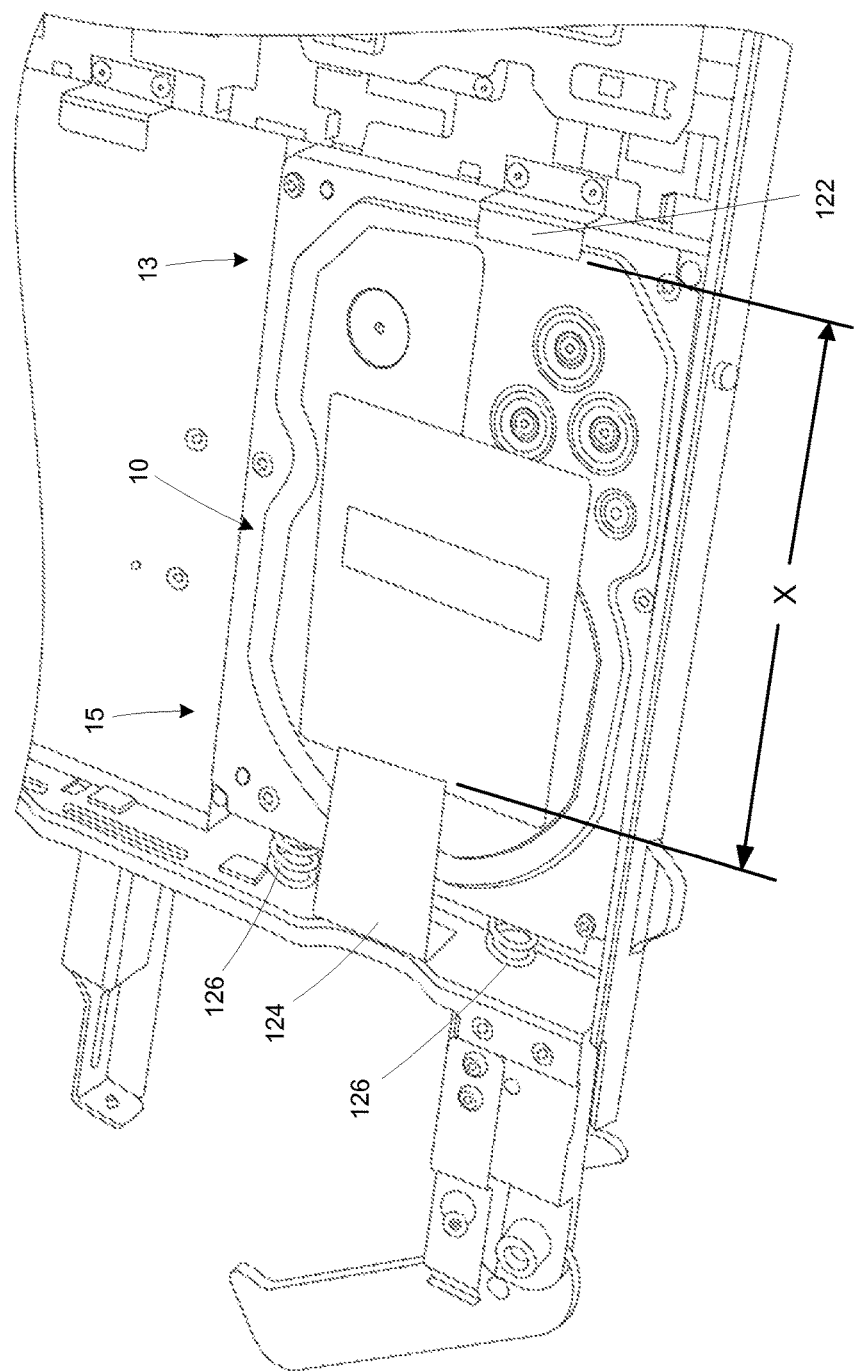
FIG. 4 is an enlarged partial perspective view of the hard disc drive of FIG. 3 fully inserted into the drive bay.

FIG. 3 illustrates a memory drive 10 partially inserted into the drive bay 112. In this embodiment, the memory drive 10 is a 3.5 inch HDD. The memory drive 10 is installed in the drive bay 112 by sliding a rear end portion 15 of the memory drive 10 under the second retainer tab 124 and against the resilient members 126 so as to compress the resilient members 126 until the rear end portion 15 of the memory drive 10 clears the first retainer tab 122 and can move downwardly into the drive bay 112 toward the bottom wall 117. As shown in FIG. 4, the memory drive 10 is placed under the first retainer tab 122 by moving the memory drive 10 toward the drive connector 120 (see FIG. 2) until it engages the drive connector 120. The resilient members 126 urge and hold the memory drive 10 in place against the drive connector 120 with the front end portion 13 and the rear end portion 15 of the memory drive 10 positioned under the first retainer tab 122 and the second retainer tab 124, respectively. Accordingly, the first and second retainer tabs 122/124 block the memory drive 10 from inadvertently moving out of the drive bay 112 away from the bottom wall 117, which could inadvertently disconnect the memory drive 10 from the drive connector 120.

As can be appreciated in FIG. 4, the second retainer tab 124 is longer than the first retainer tab 122. In addition, the distance X between the first retainer tab 122 and second retainer tab 124 is less than the length of the memory drive 10. In this case, distance X is less than the length of a 3.5 inch HDD, specifically, distance X is less than approximately 5.8 inches. Although the memory drive storage tray is described with respect to a 3.5 inch HDD, the disclosed retainers can be used with any suitable size and type of memory drive including SSDs, as well as the memory drive carrier described below.

Figure 5:
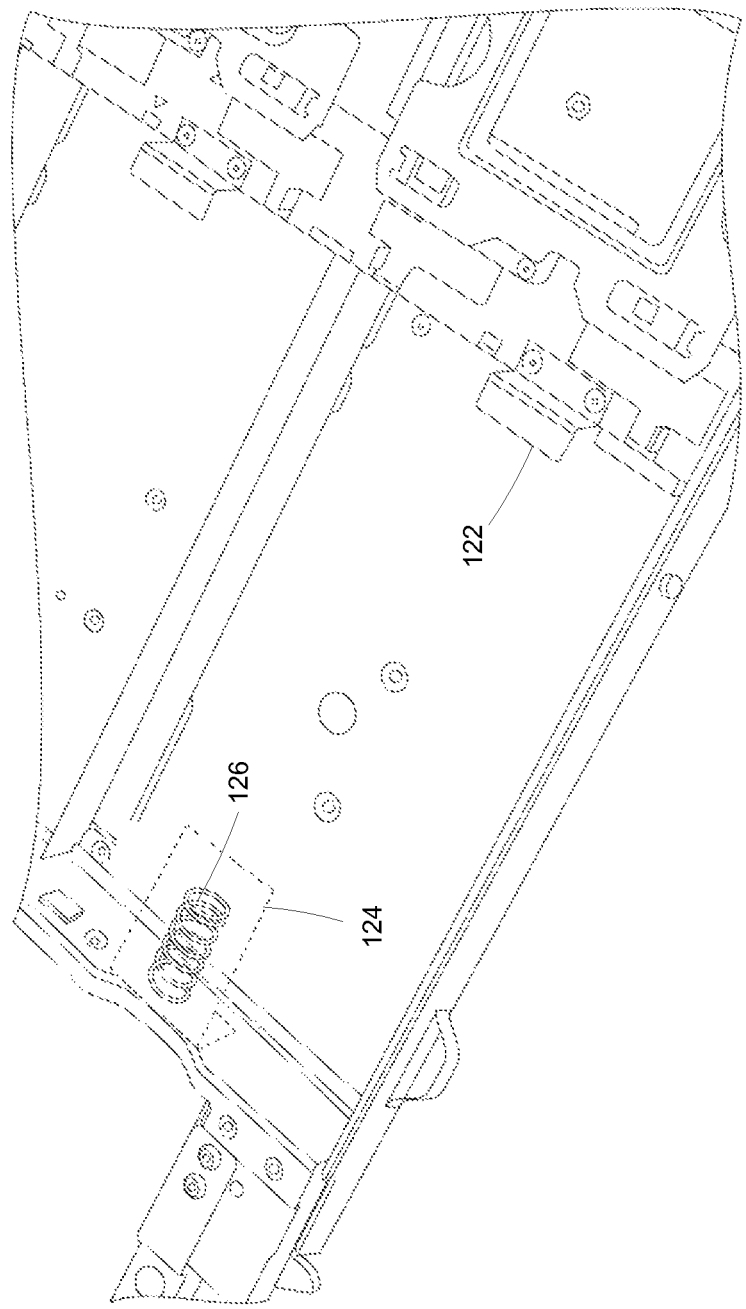
FIG. 5 is an enlarged partial perspective view of a memory drive storage tray according to another representative embodiment.
Figure 6:
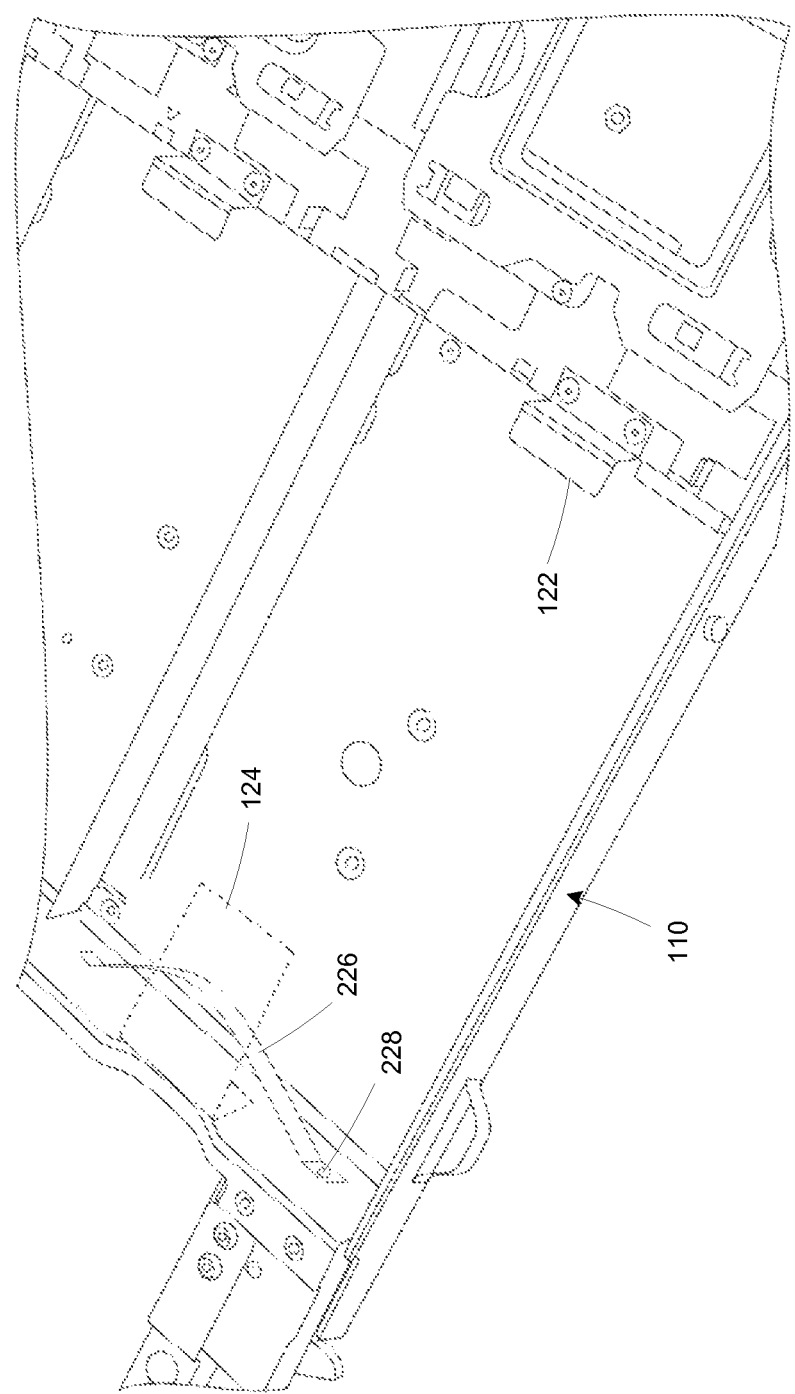
FIG. 6 is an enlarged partial perspective view of a memory drive storage tray according to a further representative embodiment.

FIG. 5 illustrates another representative embodiment of the memory drive storage tray that employs a single centrally located resilient member 126 positioned under the second retainer tab 124. Centrally located resilient member 126 has the advantage of contacting the HDD platter housing which should remain consistent across different manufacturers. In some embodiments, as shown in FIG. 6, the resilient member comprises a leaf spring 226 attached to the frame 110 by a rivet 228. It should be appreciated that the leaf spring 226 can be attached to the frame 110 at only one end with the rivet 228 or other fastener, thereby allowing the leaf spring 226 to compress.

Figure 7:
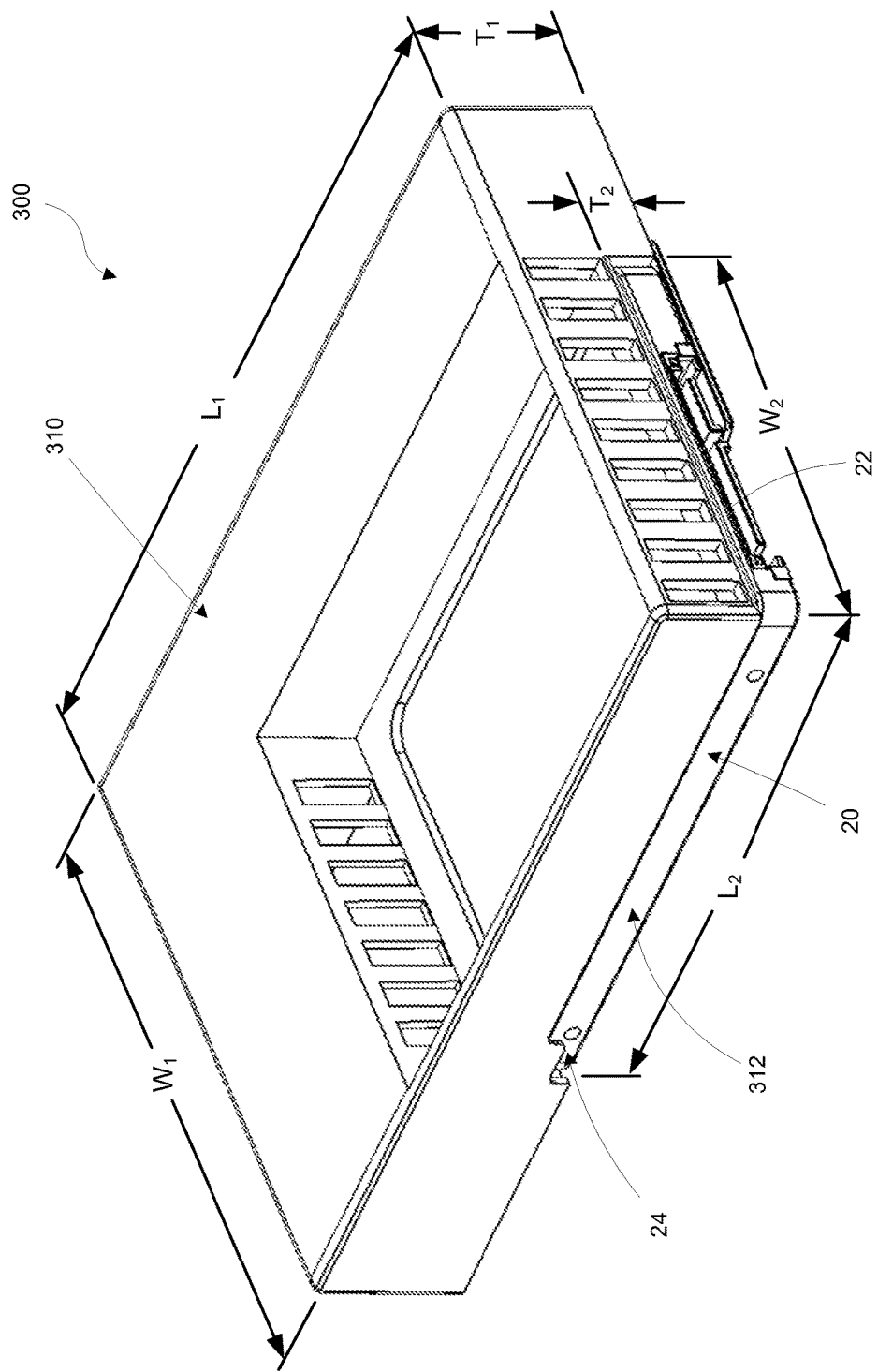
FIG. 7 is perspective view of a memory drive carrier for adapting a memory drive for insertion into a drive bay.

FIG. 7 illustrates a memory drive carrier 300 according to a representative embodiment for adapting a memory drive 20 having a memory drive connector 22 for insertion into a drive bay, such as a drive bay 112 described above with respect to FIGS. 1-6. In this embodiment, memory drive 20 is a 2.5 inch SSD. The drive bays 112 are larger than the memory drive 20 as they are configured to receive a 3.5 inch HDD. Although the memory drive carrier 300 is described with respect to a 2.5 inch SSD, the disclosed memory drive carrier technology can be used with any suitable size and type of memory drive, including HDDs, smaller than the drive bay 112.

The memory drive carrier 300 includes an adapter body 310 having an envelope that is compatible with drive bay 112. The adapter body's envelope is defined by its length $L_1$, width $W_1$, and thickness $T_1$. Accordingly, in this embodiment, these dimensions correspond to a 3.5 inch HDD. Thus, in some embodiments, $L_1$=approximately 5.75 inches, $W_1$=approximately 4 inches, and $T_1$=approximately 1 inch. The adapter body 310 includes a slot 312 that is sized to receive the memory drive 20. Accordingly, the slot 312 has a length $L_2$, a width $W_2$, and a thickness $T_2$ which correspond to the dimensions of the memory drive 20. In some embodiments, $L_2$=approximately 4 inches, $W_2$=approximately 2.75 inches, and $T_2$=approximately 0.276 inches which correspond to the dimensions of a 2.5 inch SSD. In some embodiments, $T_2$=approximately 0.59 inches. The slot 312 is positioned within the envelope of the adapter body 310 in order to position the memory drive connector 22 within the envelope adjacent an associated drive connector 120 of drive bay 112 (see FIG. 2). Although specific representative dimensions are provided above, it should be understood that the dimensions can be adjusted to suit various sizes and types of memory drives and drive bays.

Figure 8:
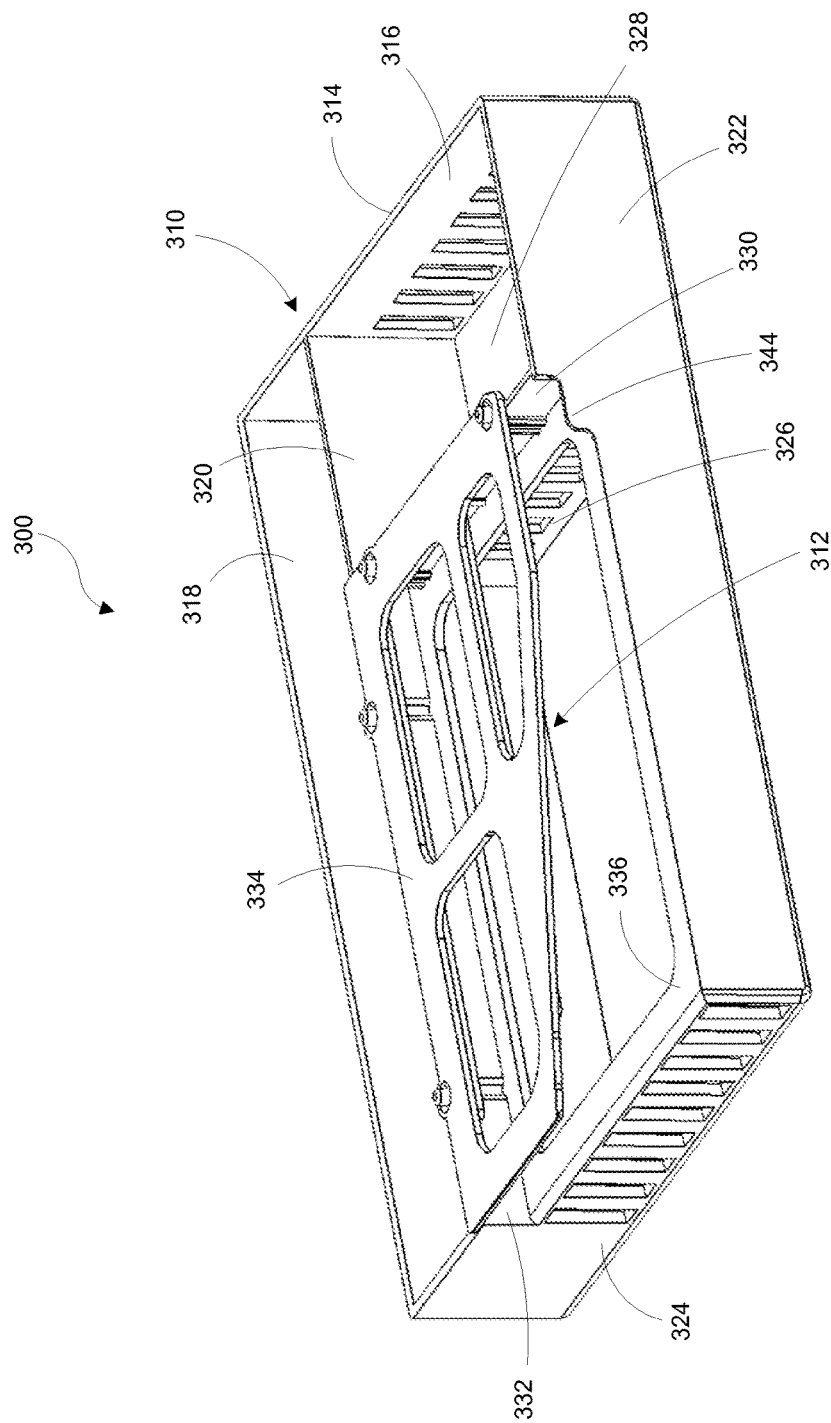
FIG. 8 is a front perspective view of the memory drive carrier shown in FIG. 7 as viewed from underneath.

As shown in FIG. 8, the adapter body 310 includes a frame 314 comprising a plurality of surrounding wall portions. For example, the frame 314 includes front wall portion 324, back wall portion 316, and side wall portions 318 and 322. The frame 314 also includes partitions 320 and 326. Adapter body 310 also includes a plurality of spaced apart walls that define the slot 312. Specifically, the spaced apart walls include a back wall 330, a side wall 332, an upper wall 336, and a lower wall 334. A retainer tab 344 is positioned opposite the side wall 332. The retainer tab 344 is a thin structure and only extends partially along slot 312. The retainer tab 344 helps to maintain the memory drive 20 in the slot 312 while not interfering with locating the memory drive connector 22 of the memory drive 20 such that it can interface with the drive connector 120 of drive bay 112. The memory drive 20 is placed in the memory drive carrier 300 by inserting a rear end portion 24 (see FIG. 7) of the memory drive 20 into the slot 312 between the upper wall 336 and the lower wall 334 until the rear end portion 24 contacts the back wall 330, and the memory drive 20 is between the side wall 332 and the retainer tab 344. Once the memory drive 20 is placed in the memory drive carrier, the memory drive carrier 300 along with the memory drive 20 can be installed into the drive bay 112 as if it were a 3.5 inch HDD as explained above with respect to FIGS. 3 and 4. Thus, the memory drive connector 22 of the memory drive 20 is connected to the drive connector 120 of the drive bay 112.

Figure 9:
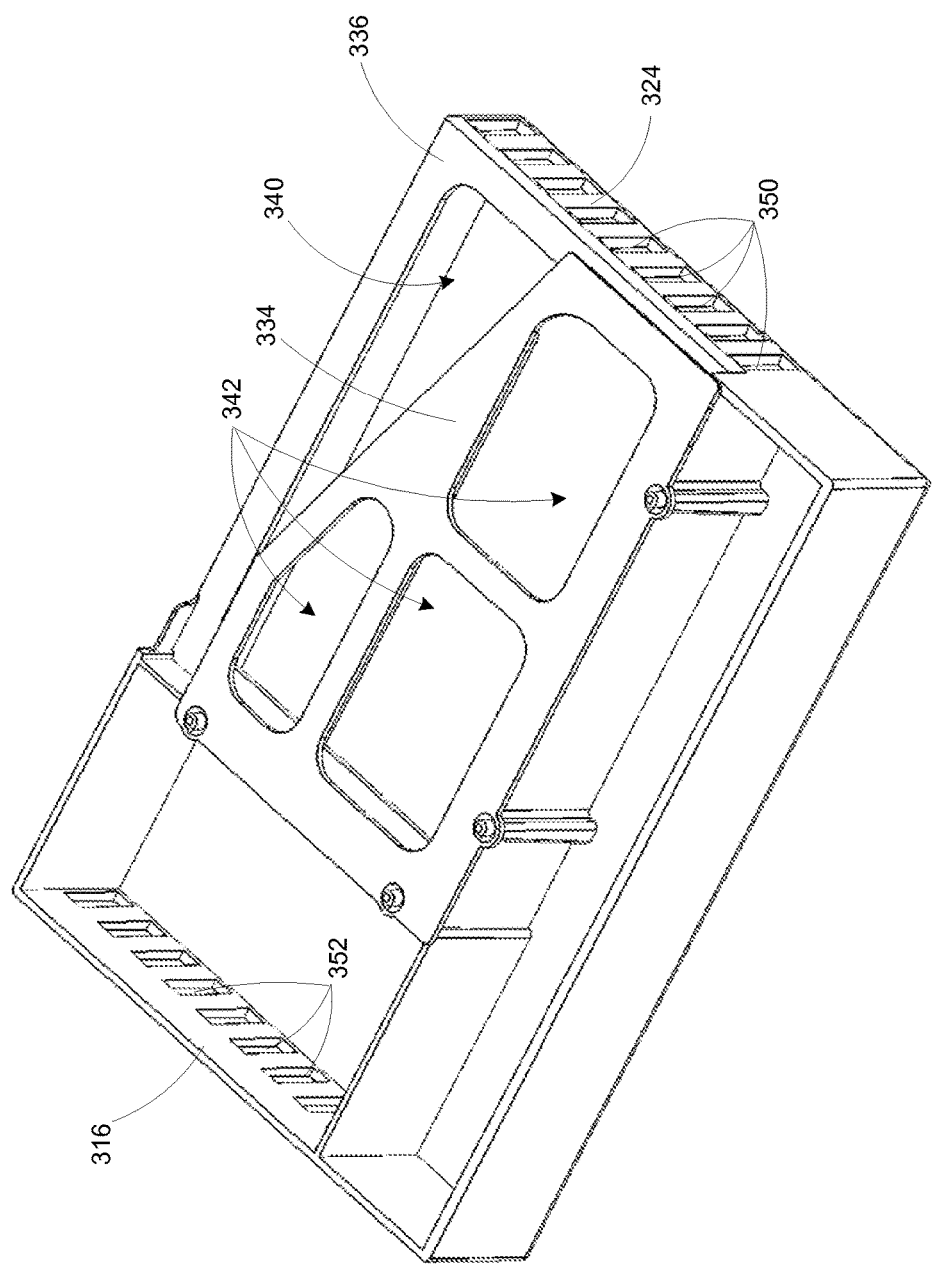
FIG. 9 is a rear perspective view of the memory drive carrier shown in FIGS. 7 as viewed from underneath.

With further reference to FIG. 9, it can be appreciated that selected ones of the wall portions and the partitions include one or more vent openings. For example, the back wall portion 316 includes a plurality of vent openings 352, and the front wall portion 324 includes a plurality of vent openings 350. It should be understood that the vent openings 352 and 350, for example, facilitate cooling of the memory drive 20 when installed in the memory drive carrier 300. To that end, the upper wall 336 and the lower wall 334 both include apertures to further facilitate cooling. In this embodiment, the upper wall 336 includes one large aperture 340, and the lower wall 334 includes three apertures 342. Although particular vent openings and apertures are shown with respect to the described embodiments, other vent openings and apertures may be included or omitted to facilitate cooling as needed depending on the type and size of the memory drive.

Figure 10:
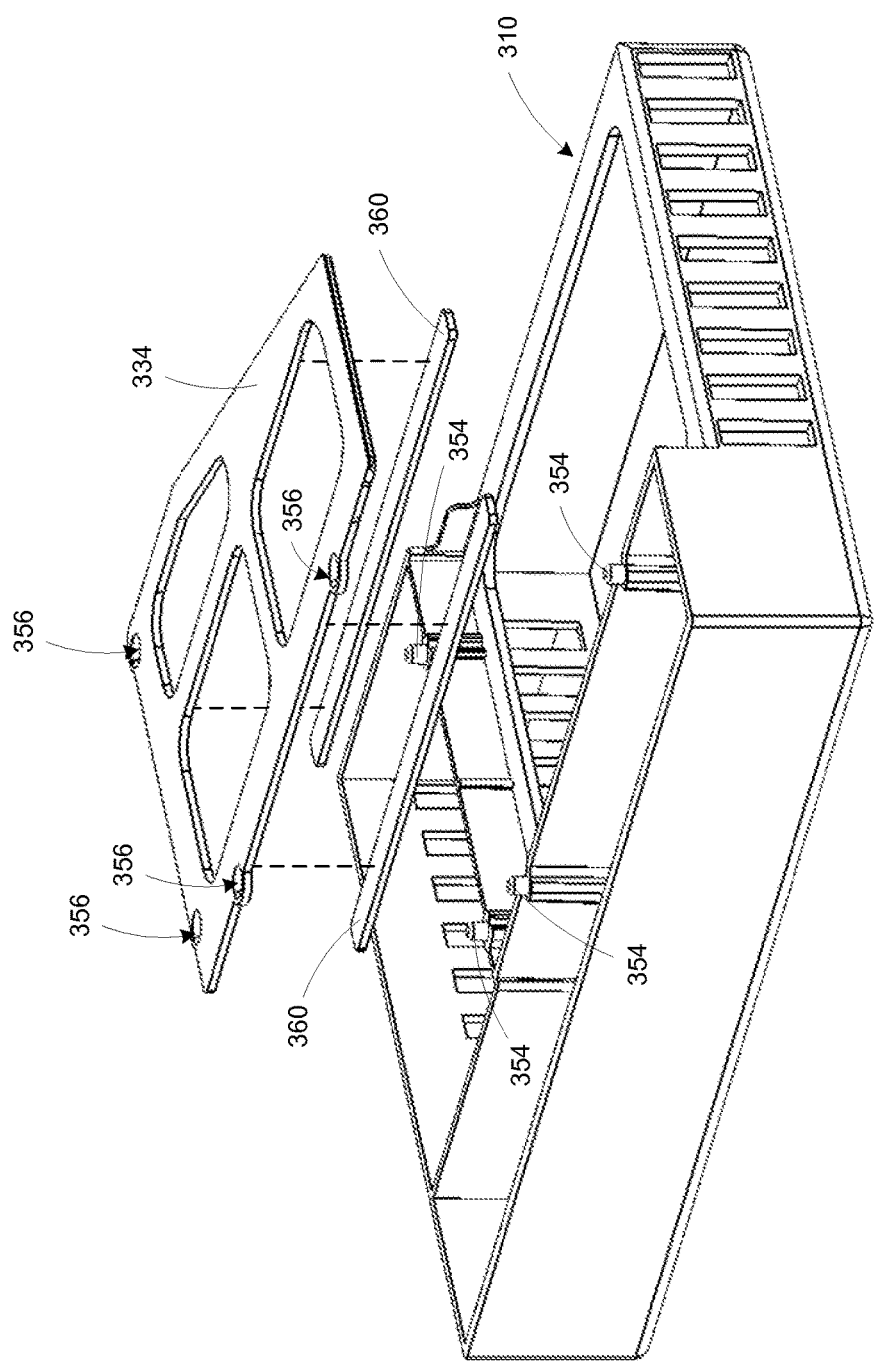
FIG. 10 is an exploded bottom perspective view of the memory drive carrier of FIG. 9.

As shown in FIG. 10, in some embodiments, the lower wall 334 can comprise a separate plate that is attached to the adapter body 310. In some embodiments, the lower wall 334 is comprised of a metallic material, for example, in order to act as an integral heat sink to help dissipate heat from the memory drive 20. Furthermore, making the lower wall 334 a separate piece may also facilitate injection molding of the memory drive carrier 300. In some embodiments, the adapter body 310 includes a plurality of pins 354 to which the lower wall 334 can be attached. For example, the lower wall 334 can include a plurality of mating apertures 356 that receive the pins 354. The pins 354 may be melted or staked to retain the lower wall 334 on the carrier. In some embodiments, a pair of rubber strips 360 may be adhered to the lower wall 334 to help maintain the memory drive 20 in position within the slot 312.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A memory drive storage tray for use with one or more memory drives, comprising:
   a frame defining one or more drive bays, selected ones of the one or more drive bays including:
      an associated drive connector for connecting to a memory drive substantially parallel to a bottom plane of the one or more drive bays;
      a first retainer tab positioned on the frame adjacent the associated drive connector such that the memory drive can be positioned under the first retainer tab, wherein the first retainer tab comprises a retaining portion extending substantially parallel to the bottom plane, an attachment portion attached to the frame, and an intermediate portion connecting the retaining portion and the attachment portion, and wherein the retaining portion, the intermediate portion, and the attachment portion of the first retainer tab is arranged in a Z-shape;
      a second retainer tab positioned on the frame on a side of the drive bay opposite the first retainer tab such that the memory drive can be positioned under the second retainer tab, wherein the second retainer tab comprises a retaining portion extending towards the first retainer tab substantially parallel to the bottom plane and an attachment portion attached to frame and connected to the retaining portion, and wherein the retaining portion and the attachment portion of the second retainer tab is arranged in an L-shape; and
      at least one resilient member positioned in the drive bay adjacent the second retainer tab and operative to urge the memory drive toward the associated drive connector, wherein only one end of the resilient member is attached to the frame;
      wherein a length of the retaining portion of the second retainer tab extending towards the first retainer tab is longer than a length of the retaining portion of the first retainer tab extending towards the second retainer tab such that the memory drive can be slid under the second retainer tab to compress the resilient member in order to clear the first retainer tab.

2. The memory drive storage tray of claim 1, wherein the at least one resilient member is a compression spring.

3. The memory drive storage tray of claim 1, wherein the at least one resilient member is a leaf spring.

4. The memory drive storage tray of claim 1, wherein the first and second retainer tabs are spaced apart from each other by a distance less than a length of the memory drive.

5. The memory drive storage tray of claim 1, wherein the associated drive connector is aligned with and engageable with the memory drive.

6. A memory drive storage tray for use with one or more memory drives, comprising:
   a frame defining one or more drive bays, selected ones of the one or more drive bays including:
      an associated drive connector for connecting to a memory drive substantially parallel to a bottom plane of the one or more drive bays;
      a first retainer tab positioned on a first portion of the frame adjacent the associated drive connector such that the memory drive can be positioned under the first retainer tab, wherein the first retainer tab comprises a retaining portion extending substantially parallel to the bottom plane, an attachment portion attached to the frame, and an intermediate portion connecting the retaining portion and the attachment portion, and wherein the retaining portion, the intermediate portion, and the attachment portion of the first retainer tab is arranged in a Z-shape;
      a second retainer tab positioned on the frame on a second portion of the frame opposite the first portion of the frame such that the memory drive can be positioned under the second retainer tab, wherein the second retainer tab comprises a retaining portion extending towards the first retainer tab substantially parallel to the bottom plane and an attachment portion attached to the frame and connected to the retaining portion, and wherein the retaining portion and the attachment portion of the second retainer tab is arranged in an L-shape; and
      a resilient member positioned in the selected ones of the one or more drive bays on the second portion of the frame and operative to urge the memory drive toward the associated drive connector, wherein only one end of the resilient member is attached to the frame;
   wherein a length of the retaining portion of the second retainer tab extending towards the first retainer tab is longer than a length of the retaining portion of the first retainer tab extending towards the second retainer tab such that the memory drive can be slid under the second retainer tab to compress the resilient member in order to clear the first retainer tab.

7. The memory drive storage tray of claim 6, wherein the first and second retainer tabs are attached to the frame with rivets.

8. The memory drive storage tray of claim 6, wherein the resilient member is centrally positioned on the second portion of the frame.

9. The memory drive storage tray of claim 6, wherein the frame comprises sheet metal.

10. The memory drive storage tray of claim 6, wherein the first and second retainer tabs are spaced apart from each other by a distance less than a length of a 3.5 inch hard disc drive.

11. The memory drive storage tray of claim 10, wherein the first and second retainer tabs are spaced apart from each other by a distance less than approximately 5.8 inches.

12. The memory drive storage tray of claim 6, wherein the resilient member is a compression spring.

13. The memory drive storage tray of claim 6, wherein the resilient member is a leaf spring.

14. A memory drive storage tray for use with one or more memory drives, comprising:
   a sheet metal frame defining one or more drive bays, selected ones of the one or more drive bays including:
      an associated drive connector for connecting to a memory drive substantially parallel to a bottom plane of the one or more drive bays;
      a first retainer tab positioned on a first portion of the sheet metal frame adjacent the associated drive connector such that the memory drive can be positioned under the first retainer tab, wherein the first retainer tab comprises a retaining portion extending substantially parallel to the bottom plane, an attachment portion attached to the frame, and an intermediate portion connecting the retaining portion and the attachment portion, and wherein the retaining portion, the intermediate portion, and the attachment portion of the first retainer tab is arranged in a Z-shape;
      a second retainer tab positioned on the sheet metal frame on a second portion of the sheet metal frame opposite the first retainer tab such that the memory drive can be positioned under the second retainer tab, wherein the second retainer tab comprises a retaining portion extending towards the first retainer tab substantially parallel to the bottom plane and an attachment portion attached to the frame and connected to the retaining portion, and wherein the retaining portion and the attachment portion of the second retainer tab is arranged in an L-shape; and
      a leaf spring centrally positioned in the selected ones of the one or more drive bays on the second portion and operative to urge the memory drive toward the associated drive connector, wherein the leaf spring is attached to the sheet metal frame at only one end, and a length of the second retainer tab extending towards the first retainer tab is longer than a length the first retainer tab extending towards the second retainer tab such that the memory drive can be slid under the second retainer tab to compress the leaf spring in order to clear the first retainer tab.

15. The memory drive storage tray of claim 14, wherein the first and second retainer tabs are integrally formed with the sheet metal frame.

16. The memory drive storage tray of claim 14, wherein the first and second retainer tabs are spaced apart from each other by a distance less than a length of a 3.5 inch hard disc drive.

17. The memory drive storage tray of claim 16, wherein the first and second retainer tabs are spaced apart from each other by a distance less than approximately 5.8 inches.

* * * * *